(12) United States Patent
Fotopoulos

(10) Patent No.: US 10,088,954 B2
(45) Date of Patent: Oct. 2, 2018

(54) OBJECT FILTER

(71) Applicant: Synaptics Incorporated, San Jose, CA (US)

(72) Inventor: Nickolas Fotopoulos, San Jose, CA (US)

(73) Assignee: Synaptics Incorporated, San Jose, CA (US)

(*) Notice: Subject to any disclaimer, the term of this patent is extended or adjusted under 35 U.S.C. 154(b) by 157 days.

(21) Appl. No.: 15/279,628

(22) Filed: Sep. 29, 2016

(65) Prior Publication Data

US 2018/0046321 A1 Feb. 15, 2018

(30) Foreign Application Priority Data

Aug. 11, 2016 (CN) .......................... 2016 1 0653633

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0414* (2013.01)

(58) Field of Classification Search
CPC ....... G06F 3/044; G06F 3/0416; G06F 3/0418
See application file for complete search history.

(56) References Cited

U.S. PATENT DOCUMENTS

| 7,031,886 | B1 | 4/2006 | Hargreaves |
| 7,643,011 | B2 | 1/2010 | O'Connor et al. |
| 7,876,311 | B2 | 1/2011 | Krah et al. |
| 7,986,193 | B2 | 7/2011 | Krah |
| 8,248,084 | B2 | 8/2012 | Bokma et al. |
| 8,395,395 | B2 | 3/2013 | Bruwer et al. |
| 8,487,912 | B1 | 7/2013 | Peterson |
| 8,736,570 | B2 | 5/2014 | Murphy et al. |
| 9,092,098 | B2 | 7/2015 | Konovalov et al. |
| 9,128,570 | B2 | 9/2015 | Vallis et al. |
| 9,229,576 | B2 | 1/2016 | Ng et al. |
| 9,405,401 | B2* | 8/2016 | Karpin .................... G06F 3/044 |
| 9,703,421 | B2* | 7/2017 | Bai ........................ G06F 3/0418 |
| 2008/0157893 | A1 | 7/2008 | Krah |
| 2011/0007028 | A1 | 1/2011 | Curtis et al. |
| 2012/0043970 | A1 | 2/2012 | Olson |
| 2012/0200524 | A1* | 8/2012 | Vallis ..................... G06F 3/044 345/174 |

(Continued)

*Primary Examiner* — Patrick F Marinelli
(74) *Attorney, Agent, or Firm* — Ferguson Braswell Fraser Kubasta PC

(57) ABSTRACT

A method of capacitive sensing that may include obtaining, from various sensor electrodes, a capacitive image of a sensing region. The capacitive image may describe changes in variable capacitance among the sensor electrodes. The method may further include identifying an object signal value within the capacitive image. The object signal value may be identified from an object response that is produced by an input object that is proximate to the sensor electrodes. The method may further include determining, using the object signal value of the object response, an artifact threshold that identifies an artifact response within the capacitive image. The method may further include excluding, using the artifact threshold, artifact information regarding the artifact response from a report to a computing system.

16 Claims, 8 Drawing Sheets

(56) References Cited

U.S. PATENT DOCUMENTS

| | | | |
|---|---|---|---|
| 2012/0242619 A1* | 9/2012 | Reis Barbosa | G06F 3/011 345/174 |
| 2012/0274604 A1 | 11/2012 | Norton et al. | |
| 2013/0106779 A1 | 5/2013 | Company Bosch et al. | |
| 2013/0120053 A1 | 5/2013 | Mei et al. | |
| 2013/0127756 A1 | 5/2013 | Wang et al. | |
| 2013/0321349 A1* | 12/2013 | Kim | G06F 3/0418 345/178 |
| 2014/0015768 A1* | 1/2014 | Karpin | G06F 3/0418 345/173 |
| 2014/0204058 A1 | 7/2014 | Huang et al. | |
| 2015/0015528 A1* | 1/2015 | Vandermeijden | G06F 3/044 345/174 |
| 2015/0015539 A1* | 1/2015 | Fotopoulos | G06F 3/044 345/174 |
| 2015/0029137 A1 | 1/2015 | Cheng et al. | |
| 2016/0195998 A1* | 7/2016 | Bai | G06F 3/0418 345/174 |
| 2018/0046321 A1* | 2/2018 | Fotopoulos | G06F 3/0418 |

* cited by examiner

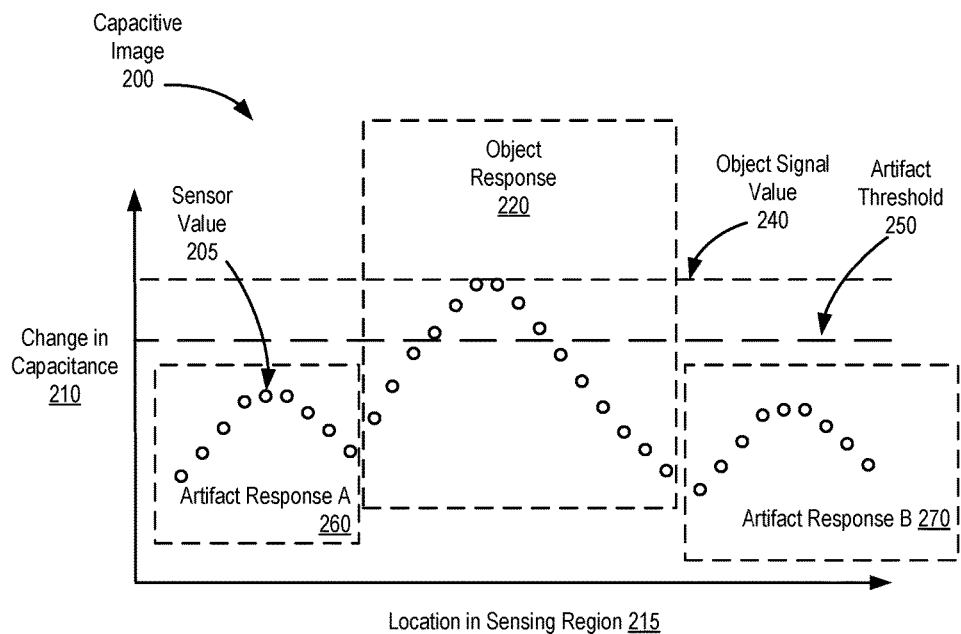
FIG. 2.1
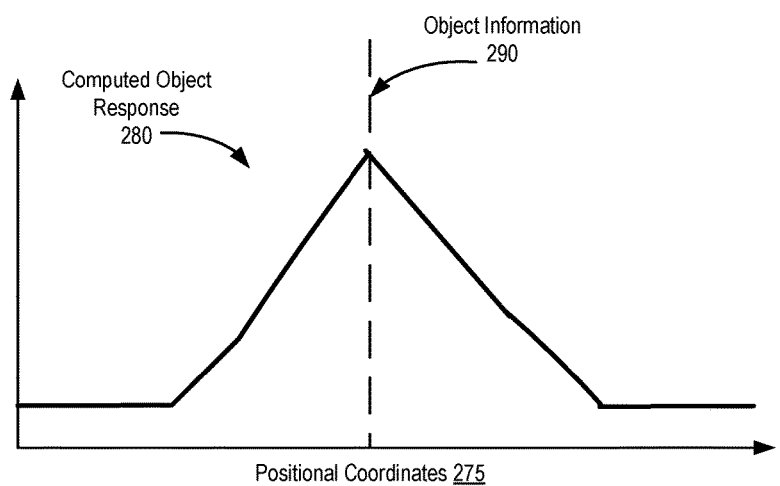
FIG. 2.2

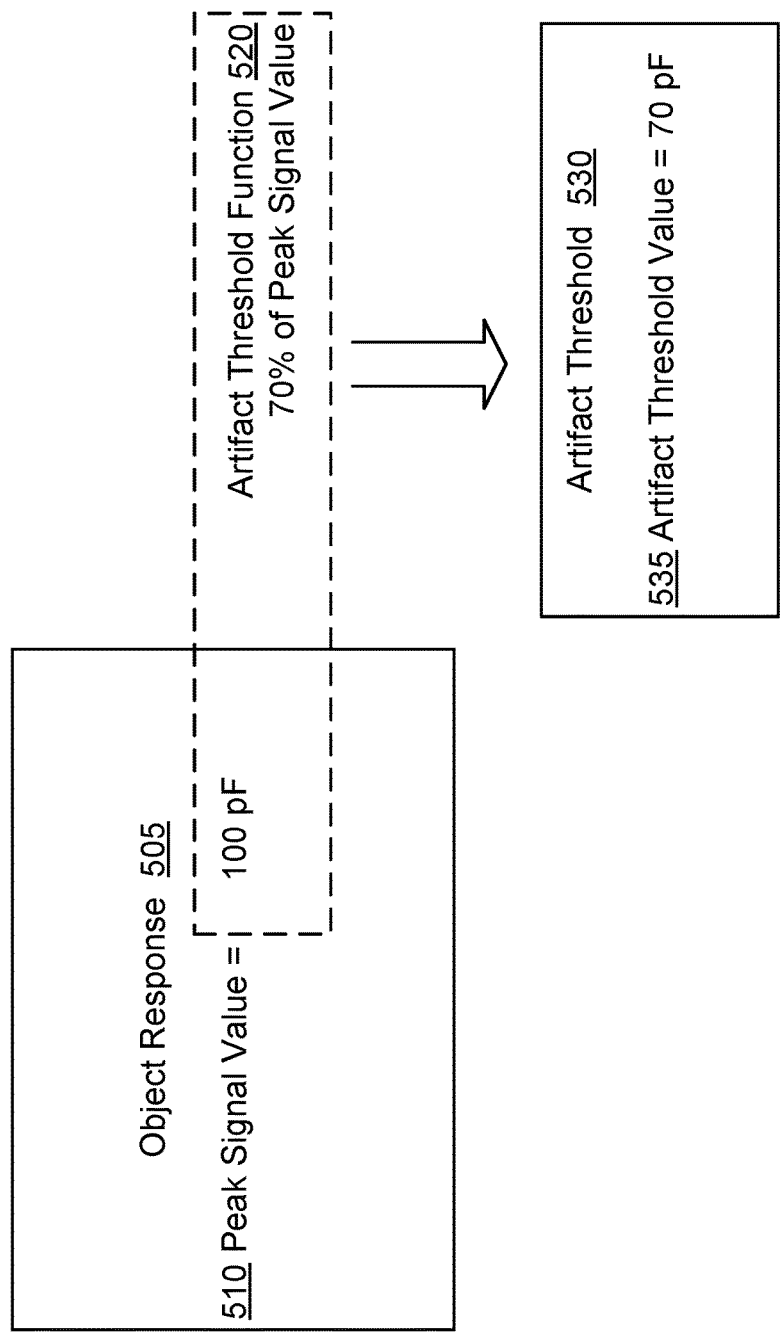
FIG. 5.1

| Capacitive Response A 541 | Threshold Comparison Function 560 |
|---|---|
| 531 Peak Signal Value A = 80 pF | 70 pF |
| 551 Positional Information A = (2 cm, 5 cm) | |

| Capacitive Response B 542 | Threshold Comparison Function 560 |
|---|---|
| 532 Peak Signal Value B = 50 pF | 70 pF |
| 552 Positional Information B = (5 cm, 7 cm) | |

| Capacitive Response C 543 | Threshold Comparison Function 560 |
|---|---|
| 533 Peak Signal Value C = 75 pF | 70 pF |
| 553 Positional Information A = (8 cm, 1 cm) | |

FIG. 5.2

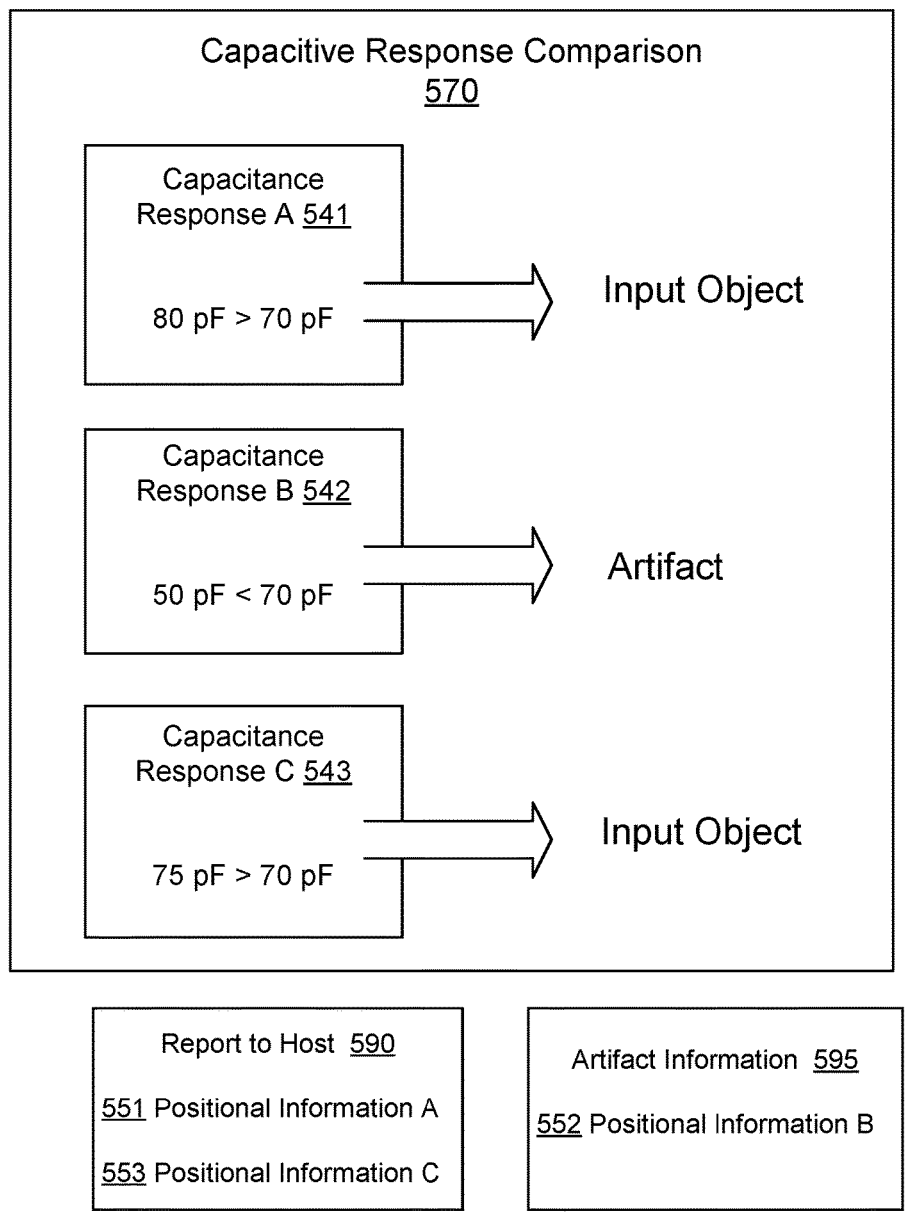
FIG. 5.3

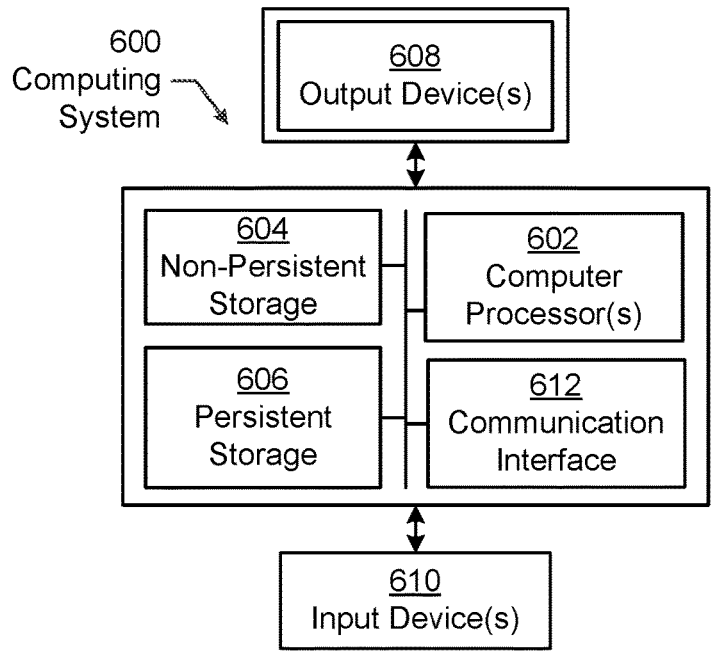
FIG. 6.1
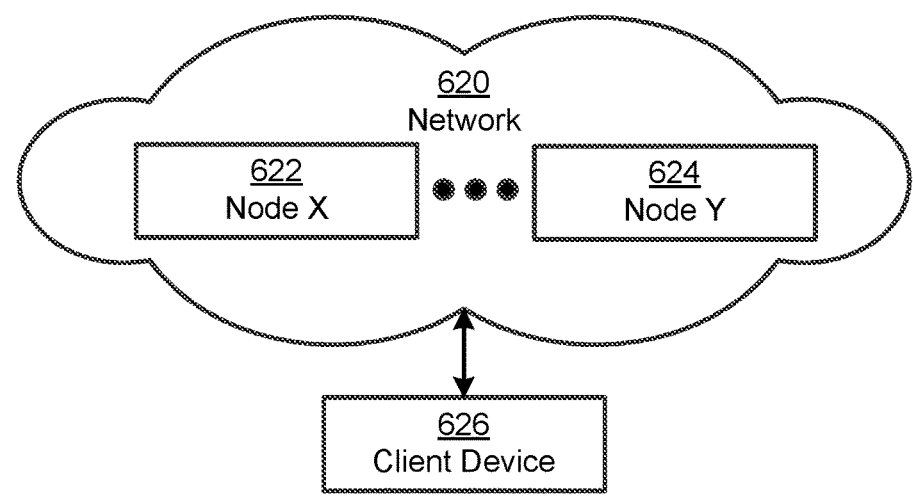
FIG. 6.2

OBJECT FILTER

CROSS REFERENCE TO RELATED APPLICATIONS

This application claims benefit under 35 U.S.C. § 119(a) to Chinese Patent Application Serial Number 201610653633.1, filed on Aug. 11, 2016 and entitled, "OBJECT FILTER." Chinese Patent Application Serial Number 201610653633.1 is incorporated herein by reference in its entirety.

FIELD

This invention generally relates to electronic devices.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, the invention relates to a method of capacitive sensing. The method includes obtaining, from various sensor electrodes, a capacitive image of a sensing region. The capacitive image describes changes in variable capacitance among the sensor electrodes. The method further includes identifying an object signal value within the capacitive image. The object signal value is identified from an object response that is produced by an input object that is proximate to the sensor electrodes. The method further includes determining, using the object signal value of the object response, an artifact threshold that identifies an artifact response within the capacitive image. The method further includes excluding, using the artifact threshold, artifact information regarding the artifact response from a report to a computing system.

In general, in one aspect, the invention relates to a processing system coupled with an input device. The processing system includes sensor circuitry configured to obtain, from various sensor electrodes of the input device, a capacitive image of a sensing region. The capacitive image describes changes in variable capacitance among the sensor electrodes. The processing system further includes processing circuitry connected to the sensor circuitry and that identifies an object signal value within the capacitive image. The object signal value is identified from an object response that is produced by an input object that is proximate to the sensor electrodes. The processing circuitry further determines, using the object signal value of the object response, an artifact threshold that identifies an artifact response within the capacitive image. The processing circuitry further excludes, using the artifact threshold, artifact information regarding the artifact response from a report to a computing system.

In general, in one aspect, the invention relates to an input device that includes an input surface. The input device further includes various sensor electrodes coupled to a processing system. The sensor electrodes generate a capacitive image of a sensing region. The capacitive image describes changes in variable capacitance among the sensor electrodes. The processing system identifies an object signal value corresponding to an object response within the capacitive image. The object response is produced by an input object that is proximate to the sensing region. The processing system further determines an artifact threshold using the object signal value of the object response. The processing system further excludes, using the artifact threshold, artifact information regarding an artifact response from a report to a computing system.

Other aspects of the invention will be apparent from the following description and the appended claims.

BRIEF DESCRIPTION OF DRAWINGS

FIGS. 2.1 and 2.2 show diagrams in accordance with one or more embodiments.

FIGS. 5.1, 5.2, and 5.3 show an example in accordance with one or more embodiments.

FIGS. 6.1 and 6.2 show a computing system in accordance with one or more embodiments.

DETAILED DESCRIPTION

Figure 1:
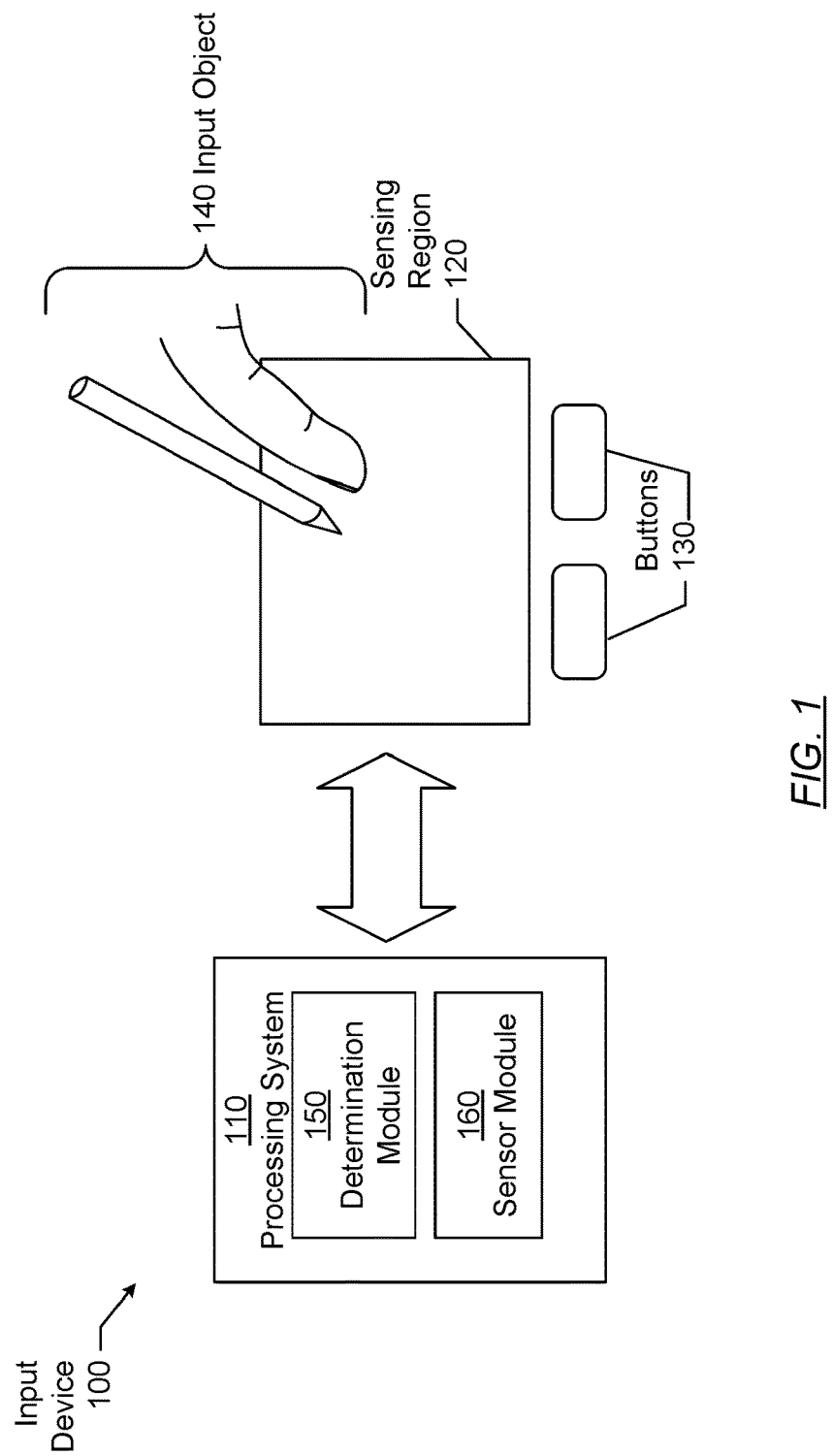
FIG. 1 shows a block diagram in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments provide input devices and methods that facilitate improved usability. In particular, one or more embodiments are directed to a method that excludes artifact information from being reported to a host device. In one or more embodiments, for example, various sensor electrodes may obtain sensor values to generate a capacitive image with sensor values. From the capacitive image, a processing system may determine an object signal value and an artifact threshold, respectively. This artifact threshold may be used to distinguish between sensor values that are the result of artifacts caused by various processing system and/or input device operations, and sensor values that are the result of an actual input object. In one or more embodiments, for example, the maximum sensor value within the capacitive image is the object signal value as the object response may have the strongest effect on the capacitive image. Therefore, the artifact threshold may be a specified percentage of the object signal value and/or obtained by another function.

Using the artifact threshold, a comparison may be performed on different sets of sensor values to identify artifact responses and/or object responses accordingly. Information that may be associated with an artifact response, such as positional information or force information, is removed or ignored by a processing system from communications with the host device, e.g., as part of a regular report transmitted during a reporting interval to the host device.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) as part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular form of input object is used. Although the singular form is used, multiple input objects exist in the sensing region (120). Further, which particular input objects are in the sensing region may change over the course of one or more gestures. For example, a first input object may be in the sensing region to perform the first gesture, subsequently, the first input object and a second input object may be in the above surface sensing region, and, finally, a third input object may perform the second gesture. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitance implementations of the input device (100), voltage or current is applied to create an electric field. Nearby input objects cause changes in the electric field, and produce detectable changes in capacitive coupling that may be detected as changes in voltage, current, or the like.

Some capacitance implementations utilize arrays or other regular or irregular patterns of capacitive sensing elements to create electric fields. In some capacitance implementations, separate sensing elements may be ohmically shorted together to form larger sensor electrodes. Some capacitance implementations utilize resistive sheets, which may be uniformly resistive.

Some capacitance implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may by a substantially constant voltage or a varying voltage and in various embodiments; the reference voltage may be system ground. Measurements acquired using absolute capacitance sensing methods may be referred to as absolute capacitance measurements.

Some capacitance implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals (also called "sensing signal"). Receiver sensor electrodes may be held substantially constant relative to the reference voltage to facilitate receipt of resulting signals. The reference voltage may by a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g. other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows a determination module (150) and a sensor module (160), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions. In one or more embodiments, the electronic system includes one or more components as described in FIGS. 6.1 and 6.2.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, determine force information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

"Force information" as used herein is intended to broadly encompass force information regardless of format. For example, the force information may be provided for each object as a vector or scalar quantity. As another example, the force information may be provided as an indication that determined force has or has not crossed a threshold amount. As other examples, the force information can also include time history components used for gesture recognition. As will be described in greater detail below, positional information and force information from the processing systems may be used to facilitate a full range of interface inputs, including use of the proximity sensor device as a pointing device for selection, cursor control, scrolling, and other functions.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may configured for both display updating and input sensing. As another example, the display screen may be operated in part or in total by the processing system (110).

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer readable storage medium. Examples of non-transitory, electronically readable media include various discs, physical memory, memory, memory sticks, memory cards, memory modules, and or any other computer readable storage medium. Electronically readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Turning to FIG. 2.1, a capacitive image (200) is shown. Specifically, the capacitive image (200) may include a set of sensor values (e.g., sensor value (205)) that describes changes in capacitance resulting from one or more input objects within a sensing region of an input device, such as the input device described in FIG. 1. As such, a vertical axis of the capacitive image (200) may illustrates changes in capacitance (210), while the horizontal axis may illustrate the location in a sensing region (215) of the respective change in capacitance. In one or more embodiments, for example, the capacitive image (200) may correspond to absolute capacitance measurements as obtained by sensor electrodes in an input device, for example.

The capacitive image (200) may include one or more capacitive responses (e.g., object response (220), artifact response A (260), artifact response B (270)). In particular, a capacitive response corresponding to an object response may describe changes in capacitance produced by one or more input objects being proximate to various sensor electrodes in an input device. On the other hand, a capacitive response corresponding to an artifact response may be one or more effects that appears in the capacitive image (200) at locations in the sensing region (215) where no input object is physically proximate. While one object response (220) is shown in the capacitive image (200) in FIG. 2.1, a capacitive image may include multiple object responses.

Keeping with FIG. 2.1, an artifact response in the capacitive image (200) may be the result of various operation processes of an input device and/or processing system. For example, artifact responses may include various code division multiplexing (CDM) motion artifacts and/or parasitic capacitance effects in an input device with single-layer sensor electrodes. With CDM motion artifacts, for example, if an input object is fast-moving with respect to a frame rate and pixel size of an input device, a decoding calculation may "smear" the received signal to produce a motion artifact.

On the other hand, artifact responses may also be the result of overcorrected patches in the low ground-mass (LGM) correction algorithm, shadow effects due to the operating speed of sensor electrodes in an input device, and/or motion artifacts produced by display noise removal. For example, an LGM artifact may occur when an input object is poorly grounded. With a transcapacitive input device, for example, an LGM correction algorithm may incorrectly produce a "ghost finger" artifact due to noise in an estimate of the location of an input object in a sensing region.

Furthermore, in one or more embodiments, an object signal value (240) is computed for an object response (e.g., object response (220)) in the capacitive image (200). An object signal value may be a numerical value that includes functionality for use by a processing system to identify an object response and/or artifact response within a capacitive image. In one or more embodiments, for example, the object signal value (240) represents an approximate signal peak of an object response in the capacitive image (200) and/or a different capacitive image. In particular, sensor values of the capacitive image (200) may represent individual signal amplitudes obtained from various sensor electrodes.

In one or more embodiments, for example, the object signal value (240) is the magnitude of the maximum change in capacitance within the capacitive image (200), e.g., the maximum signal amplitude among a set of sensor values of the capacitive image (200). On the other hand, if the object signal value is based on a different capacitive image, the object signal value may be greater or less than the magnitude of the maximum change in capacitance within the capacitive image (200). Likewise, the object signal value (240) may be a localized value based on a particular object response in a capacitive image and/or be a global value with respect to each sensor value and/or each object response in a particular capacitive image.

In one or more embodiments, an artifact threshold (250) is computed for the capacitive image (200). In one or more embodiments, for example, the artifact threshold (250) includes a threshold value that includes functionality for determining an artifact response (e.g., artifact response A (260), artifact response B (270)) within the capacitive image (200). In another example, the threshold value may be a single value, a range of values, and/or a relative value (e.g., 5 pF less than the object response's maximum sensor value) for analyzing a set of sensor values in a capacitive image. As such, the artifact threshold may be used to determine whether the set of sensor values is for an object response or an artifact response.

In one or more embodiments, the artifact threshold (250) is a dynamic threshold value that changes when the object signal value changes. For example, a new capacitive image obtained by an input device may have a different maximum sensor value as the previous capacitive image obtained by the input device. As such, the new object signal value may be computed from the maximum sensor value in the new capacitive image, and thereby may result in a different numerical value from the previous object signal value. Accordingly, in one or more embodiments, the artifact threshold (250) is periodically adjusted using different object signal values. Thus, artifact responses may be identified using an adjusted artifact threshold.

Turning to FIG. 2.2, a computed object response (280) is shown with respect to various positional coordinates (275) for a sensing region of an input device. In one or more embodiments, for example, after sensor values for an object response are distinguished from sensor values from one or more artifact responses in a capacitive image, the remaining sensor values of the object response determine object information (290) for the computer object response (280). Specifically, the object information may include positional information regarding the location of an input object within a sensing region and/or force information computed in response to a deflection by the input object. Accordingly, force information may be obtained from force sensor electrodes in an input device that uses positional information to determine a magnitude of force.

In one or more embodiments, a processing system (not shown) reports the object information (290) for the object response (220) to a host device, while artifact information regarding artifact response A (260) and artifact response B (270) is ignored by the processing system. For example, the center of the computed object response (280) may be used to determine positional information that is transmitted to the host device. The host device may be a computing system as described in FIGS. 6.1 and 6.2 and the accompanying description. In one or more embodiments, for example, the reported object information (290) includes functionality to produce an input function and/or output function within the host device. For example, the reported object information (290) may produce an interface command within a graphical user interface that is displayed on the host device.

Figure 3:
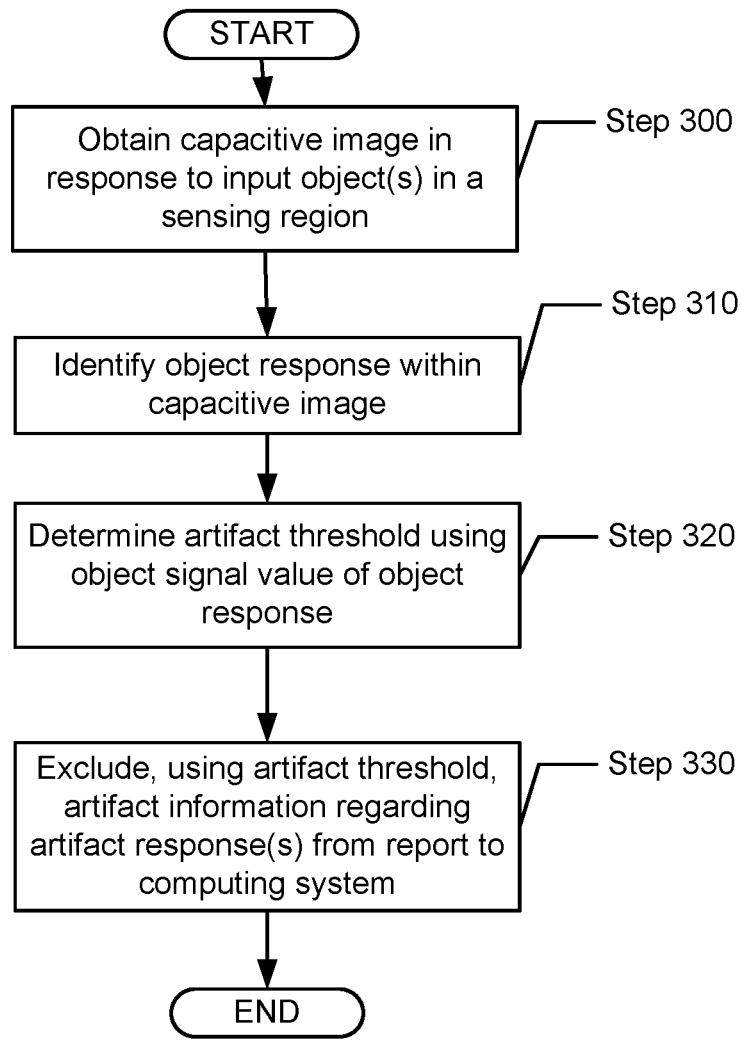
FIGS. 3 and 4 show flowcharts in accordance with one or more embodiments.

Turning to FIG. 3, FIG. 3 shows a flowchart in accordance with one or more embodiments. Specifically, FIG. 3 describes a method for filtering artifact information from being reported to a computing system. The process shown in FIG. 3 may involve, for example, one or more components discussed above in reference to FIG. 1 (e.g., processing system (110)). While the various steps in FIG. 3 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 300, a capacitive image is obtained in response to one or more input objects in a sensing region in accordance with one or more embodiments. In one or more embodiments, for example, various capacitance measurements are obtained by various sensor electrodes in an input device. Moreover, the input device may be input device (100) and the sensing region may be sensing region (120) as described in FIG. 1 and the accompanying description. The capacitive image may be similar to the capacitive image (200) described in FIG. 2.1 and the accompanying description. Likewise, the sensor electrodes may be similar to the sensor electrodes described with respect to FIG. 1 and the accompanying description. In some embodiments, the capacitance measurements may be obtained with respect to baseline measurements that are obtained when an input object is not detected in a sensing region of the input device.

In Step 310, an object response is identified within a capacitive image in accordance with one or more embodiments. In one or more embodiments, for example, a processing system analyzes a capacitive image to determine which sensor value in the capacitive image corresponds to a maximum change in capacitance among a set of sensor values for the capacitive image. As such, a processing system may determine that sensor values adjacent to the maximum change in capacitance form the object response.

In one or more embodiments, the processing system identifies the object response using a different set of sensor electrodes than the sensor electrodes that obtained the capacitive image. For example, a processing system may identify the location of an object response using one or more force sensors in an input device. Moreover, an input device may detect an input object's location within a sensing region based on a deflection of a conductive layer using the force sensor electrodes. Using the input object's location, a set of sensor values around the input object's location may be designated as an object response accordingly.

In Step 320, an artifact threshold is determined using an object signal value of an object response in accordance with one or more embodiments. In one or more embodiments, for example, an object signal value is obtained for a particular object response. In particular, if a set of sensor values is identified in Step 310 as being associated with an object response, a processing system may analyze the set of sensor values to determine the object signal value. Moreover, the object signal value may be similar to the object signal value (240) described in FIG. 2.1 and the accompanying description.

Keeping with Step 320, the artifact threshold may be determined as a function of the object signal value. For example, the artifact threshold may be a designated percentage of the object signal value (e.g., 70%, 85%, etc.). In one or more embodiments, the designated percentage of the artifact threshold is obtained through experimentation in order to identify a predetermined number of artifact responses within the capacitive image. Likewise, the artifact threshold may be a function of several object signal values obtained from multiple capacitive images, such as a predetermined number of capacitive images previously obtained by an input device in response to the presence of an input object.

In Step 330, information regarding one or more artifact responses is excluded, using an artifact threshold, from a report to a computing system in accordance with one or more embodiments. In one or more embodiments, for example, a processing system may use the artifact threshold from Step 320 to identify any other object responses within the capacitive image from Step 300. In particular, a processing system may divide a capacitive image into multiple capacitive responses. Accordingly, the processing system may analyze each capacitive response with the artifact threshold to determine whether the capacitive response is an object response or an artifact response.

Furthermore, keeping with Step 330, artifact information associated with an artifact response is excluded from a report to a computing system. For example, a processing system may report object information for multiple input objects upon detection of the input objects. The report may correspond to a reporting interval of a host device, where the processing system may generate one or more reports per reporting interval. As such, in one or more embodiments, the processing system may use the artifact threshold to identify which capacitive responses in the capacitive image correspond to actual input objects and which are artifact responses. Accordingly, the processing system may transmit positional information and/or force information to a computing device with respect to the actual input objects, while ignoring the computation of any artifact information, such as positional information and/or force information, for the artifact responses.

In another embodiment, the processing system uses an artifact threshold to determine that no object responses exist within the capacitive image obtained in Step 300. For example, the artifact threshold may be determined from an object response from a previous capacitive image. Thus, the processing system may identify, using the artifact threshold, that each capacitive response in a capacitive image is an artifact response or a false indicator of an input object. The processing system may accordingly report to the computing system that no input object is within the sensing region.

Figure 4:
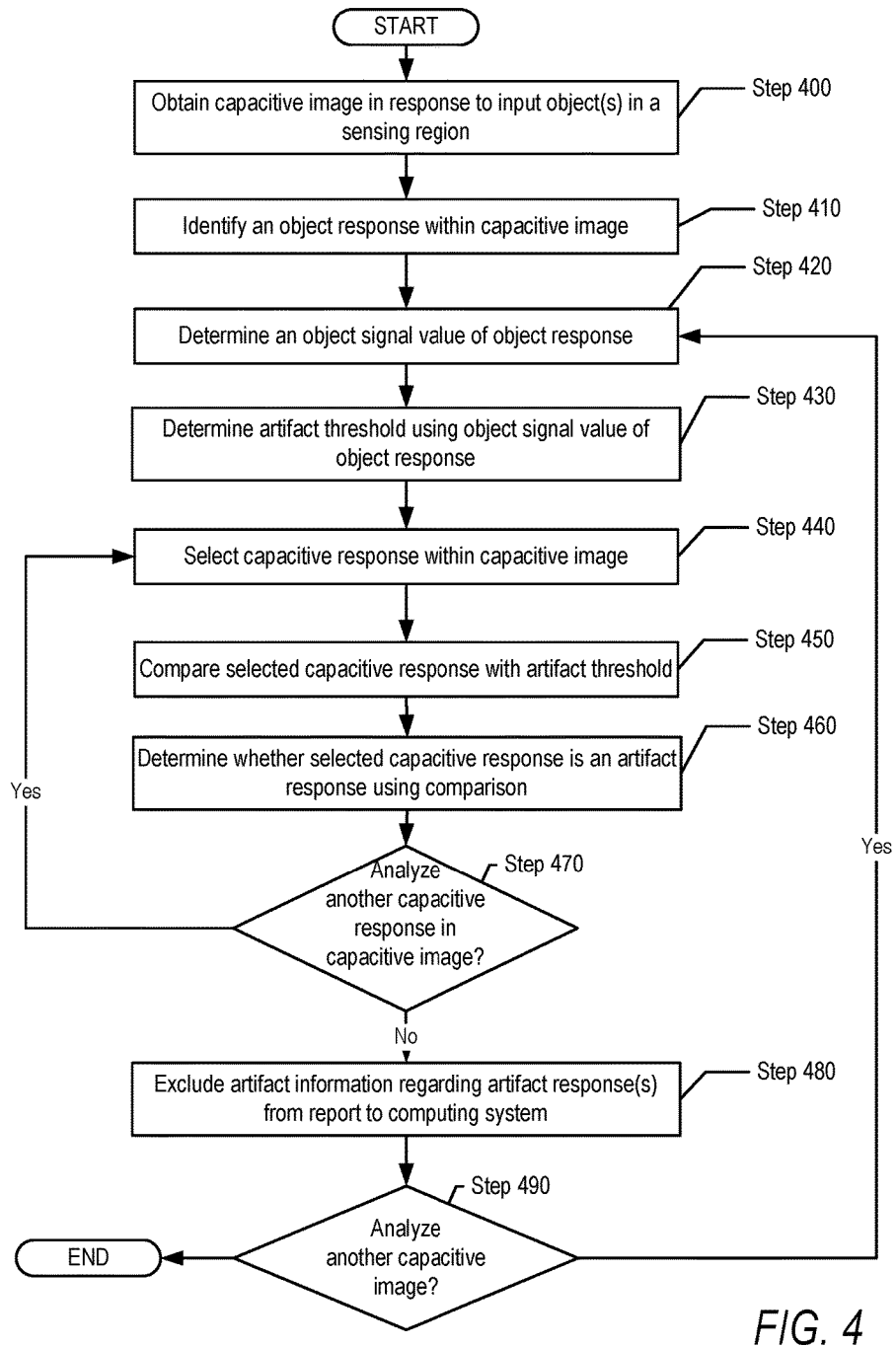

Turning to FIG. 4, FIG. 4 shows a flowchart in accordance with one or more embodiments. Specifically, FIG. 4 describes a method for filtering artifact information from being reported to a computing system. The process shown in FIG. 4 may involve, for example, one or more components discussed above in reference to FIG. 1 (e.g., processing system (110)). While the various steps in FIG. 4 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 400, a capacitive image is obtained in response to one or more input objects in a sensing region in accordance with one or more embodiments. In particular, the capacitive image may be obtained in a similar manner as described above in Step 300 of FIG. 3 and in the accompanying description.

In Step 410, an object response is identified within a capacitive image in accordance with one or more embodiments. In particular, the object response may be identified in a similar manner as described above in Step 310 of FIG. 3 and in the accompanying description.

In Step 420, an object signal value of an object response is determined in accordance with one or more embodiments. In one or more embodiments, in response to identifying a set of sensor values associated with a particular object response within the capacitive image (200), the object signal value (240) is the sensor value with the largest magnitude of change in capacitance. In other embodiments, the object signal value (240) may be an average among a set of sensor values in an object response, a weighted average among the set of sensor values, and/or a mathematical function computed from sensor values in multiple identified object responses. In one or more embodiments, the object signal value (240) for the capacitive image (200) is computed from one or more previous capacitive images obtained with the input device.

In Step 430, an artifact threshold is determined using an object signal value of an object response in accordance with one or more embodiments. In one or more embodiments, for example, a processing system designates an artifact threshold that is a specific proportion of the object signal value determined in Step 420. In particular, a predetermined percentage of the object signal value may be used as the artifact threshold. On the other hand, a processing system may determine the artifact threshold as a mathematical function of one or more object signal values. For example, the artifact threshold may be computed from an average object signal value obtained from multiple object responses in a capacitive image. Additionally, the artifact threshold may be a function of object signal values from one or more capacitive images.

In one or more embodiments, the artifact threshold is a dynamic threshold. In one or more embodiments, for example, the artifact threshold changes when a new capacitive image is obtained for a sensing region. On the other hand, the artifact threshold may change periodically. For example, a processing system may designate that the artifact threshold is recalculated after a specific number of capacitive images are obtained for a sensing region. Likewise, the processing system may use a reporting interval to determine when to determine a new artifact threshold. After a predetermined number of reporting intervals for a computing system, for example, the processing system may then determine an artifact threshold accordingly.

In Step 440, a capacitive response is selected within a capacitive image in accordance with one or more embodiments. Using the capacitive image obtained in Step 400, for example, the sensor values of the capacitive image may be separated into various capacitive responses. For example, a processing system may identify one or more local minimum sensor values between peaks in the capacitive image. Accordingly, the local minimum sensor value may be used to separate different capacitive responses in the capacitive images into separate sets of sensor values. On the other hand, a capacitive response may be identified and selected based on locations within the sensing region, e.g., using position coordinates.

In Step 450, a selected capacitive response is compared with an artifact threshold in accordance with one or more embodiments. In one or more embodiments, a processing system analyzes a selected capacitive response regarding whether the capacitive response has a sensor value that matches and/or exceeds the artifact threshold. For example, the processing system may compare each sensor value of the selected capacitive response with the artifact threshold. On the other hand, the processing system may determine the largest change in capacitance among the sensor values and compare the largest change in capacitance with the artifact threshold.

In Step 460, a determination is made whether a selected capacitive response is an artifact response using a comparison in accordance with one or more embodiments. Based on the comparison performed in Step 450, for example, a processing system may identify a capacitive response as an artifact response or an object response. In one or more embodiments, for example, different types of artifact responses have different artifact thresholds. Accordingly, based on the type of artifact threshold used in the comparison in Step 450, the type of artifact response may be identified as well.

In Step 470, a determination is made whether to analyze another capacitive response in a capacitive image in accordance with one or more embodiments. For example, a processing system may analyze each capacitive response iteratively until a determination is made whether each of the capacitive responses is an artifact response or object response. On the other hand, a processing system may use a search method, such as Newton's method or a step algorithm, to identify each object response without analyzing each capacitive response. When a determination is made to analyze another capacitive response in a capacitive image, the process may return to Step 440. When a determination is made that all capacitive responses have been analyzed, the process may proceed to Step 480.

In Step 480, artifact information regarding one or more artifact responses is excluded from a report to a computing system in accordance with one or more embodiments. For example, artifact information may be excluded in a similar manner as described in Step 330 of FIG. 3 and the accompanying description.

In Step 490, a determination is made whether to analyze another capacitive image in accordance with one or more embodiments. In particular, an input device may obtain another capacitive image in a similar manner as described in Step 400. For example, an input device may have a sensing interval where a new capacitive image is obtained after a specified amount of time. As such, a processing system may obtain a new object signal value and/or an adjusted artifact threshold for analyzing the new capacitive image by proceeding to Step 420. The adjusted artifact threshold may include a different threshold value from the previous artifact threshold, which may be based on the new object signal value. Likewise, the processing system may use the new object signal value to determine an adjusted artifact threshold in a similar manner as described in Step 430. On the other hand, if the processing system uses the same artifact threshold from the previous iteration of FIG. 4 to analyze the new capacitive image, the process may proceed to Step 440 accordingly. When a determination is made that no more capacitive images are to be analyzed, the process may end.

Turning to FIGS. 5.1, 5.2, and 5.3, FIGS. 5.1, 5.2, and 5.3 provide an example of excluding artifact response information from a report to a computing system. The following example is for explanatory purposes only and not intended to limit the scope of the invention.

In FIG. 5.1, a processing system (not shown) for an input device (not shown) identifies an object response (505) within a capacitive image (not shown). Specifically, the processing system determines that a peak signal value (510) of the object response (505) is 100 pF. Moreover, the processing system uses an artifact threshold function with the peak signal value (510) as an input to determine an artifact threshold (530). As the artifact threshold function (520) is designated to be 70% of the peak signal value, the artifact threshold value (535) is 70 pF accordingly.

Turning to FIG. 5.2, the processing system applies a threshold comparison function to various capacitive responses in a capacitive image (i.e., capacitive response A (541), capacitive response B (542), and capacitive response C (543)). Accordingly, the processing system may apply a threshold comparison function (560) to the capacitive responses (541, 542, 543), respectively. Specifically, the threshold comparison function (560) compares the artifact threshold value (535) with the peak signal values (531, 532, 533) of the capacitive responses (541, 542, 543). Thus, the results of the threshold comparison function (560) are shown in the capacitive response comparison (570) in FIG. 5.3. As shown, the processing system determines that capacitive response A (541) and capacitive response C (543) are directed to input objects, while the capacitive response B (542) is directed to an artifact response within the capacitive image. Accordingly, in a report to a host (590), the processing system transmits positional information (551, 553) determined for the capacitive response A (541) and the capacitive response C (543), while excluding artifact information (595), such as positional information B (552) that is associated with capacitive response B (542).

Embodiments may be implemented on a computing system. Any combination of mobile, desktop, server, router, switch, embedded device, or other types of hardware may be used. For example, as shown in FIG. 6.1, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (600) in FIG. 6.1 may be connected to or be a part of a network. For example, as shown in FIG. 6.2, the network (620) may include multiple nodes (e.g., node X (622), node Y (624)). Each node may correspond to a computing system, such as the computing system shown in FIG. 6.1, or a group of nodes combined may correspond to the computing system shown in FIG. 6.1. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (600) may be located at a remote location and connected to the other elements over a network.

Although not shown in FIG. 6.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6.1. Further, the client device (626) may include and/or perform all or a portion of one or more embodiments of the invention.

The computing system or group of computing systems described in FIGS. 6.1 and 6.2 may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (600) in FIG. 6.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 6.1, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 6.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 6.1 and the nodes and/or client device in FIG. 6.2. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of capacitive sensing, comprising:
   obtaining, from a plurality of sensor electrodes, a first capacitive image of a sensing region;
   identifying an object signal value within the first capacitive image, wherein the object signal value is identified from a first object response that is produced by an input object that is proximate to the plurality of sensor electrodes;
   determining, using the object signal value of the first object response, an artifact threshold that identifies a first artifact response within the first capacitive image, wherein determining the artifact threshold comprises:
      determining a maximum signal amplitude of the first object response, and
      designating the artifact threshold as a proportion of the maximum signal amplitude;
   determining a plurality of capacitive responses within the first capacitive image;
   determining, using the artifact threshold, which of the plurality of capacitive responses are artifact responses; and
   excluding one or more of the artifact responses from a first report to a computing system.

2. The method of claim 1,
   wherein the first capacitive image comprises a plurality of sensor values, wherein the object signal value corresponds to a sensor value with a maximum change in the variable capacitance among the plurality of sensor values, and wherein the artifact threshold is a percentage of the maximum change in capacitance.

3. The method of claim 1, further comprising:

obtaining, from the plurality of sensor electrodes, a second capacitive image;

identifying a second object signal value of a second object response within the second capacitive image;

adjusting, using the second object signal value, the artifact threshold to produce an adjusted artifact threshold; and excluding, using the adjusted artifact threshold, artifact information regarding a second artifact response from a second report to the computing system.

4. The method of claim 1, wherein determining which of the plurality of capacitive responses are artifact responses comprises:

performing, for each of the capacitive responses, a comparison between a plurality of sensor values of the capacitive response and the artifact threshold; and determining, using the comparison, whether the capacitive response is an object response or an artifact response.

5. The method of claim 4, further comprising:

determining, in response to determining that a capacitive response of the plurality of capacitive responses is an object response, positional information based on the capacitive response; and transmitting the positional information to the computing system.

6. The method of claim 1, wherein the first object response is identified within the first capacitive image using a plurality of force sensor electrodes.

7. The method of claim 1, wherein the computing system is a host device to an input device, and wherein the input device comprises the plurality of sensor electrodes.

8. A processing system coupled with an input device, comprising:

sensor circuitry configured to:

obtain, from a plurality of sensor electrodes of the input device, a first capacitive image of a sensing region, wherein the first capacitive image describes changes in variable capacitance among the plurality of sensor electrodes; and processing circuitry connected to the sensor circuitry and configured to:

identify an object signal value within the first capacitive image, wherein the object signal value is identified from a first object response that is produced by an input object that is proximate to the plurality of sensor electrodes;

determine, using the object signal value of the first object response, an artifact threshold that identifies a first artifact response within the first capacitive image, wherein determining the artifact threshold comprises:

determining a maximum signal amplitude of the first object response, and designating the artifact threshold as a proportion of the maximum signal amplitude;

determine a plurality of capacitive responses within the first capacitive image;

determine, using the artifact threshold, which of the plurality of capacitive responses are artifact responses; and exclude the one or more artifact responses from a first report to a computing system.

9. The processing system of claim 8, wherein the first capacitive image comprises a plurality of sensor values, wherein the object signal value corresponds to a sensor value with a maximum change in the variable capacitance among the plurality of sensor values, and wherein the artifact threshold is a percentage of the maximum change in capacitance.

10. The processing system of claim 8, wherein the sensor circuitry is further configured to:

obtain, from the plurality of sensor electrodes, a second capacitive image, and wherein the processing circuitry is further configured to:

identify a second object signal value of a second object response within the second capacitive image, adjust, using the second object signal value, the artifact threshold to produce an adjusted artifact threshold; and exclude, using the adjusted artifact threshold, artifact information regarding a second artifact response from a second report to the computing system.

11. The processing system of claim 8, wherein determining which of the plurality of capacitive responses are artifact responses comprises:

performing, for each of the capacitive responses, a comparison between a plurality of sensor values of the capacitive response and the artifact threshold; and determine, using the comparison, whether the capacitive response is an object response or an artifact response.

12. The processing system of claim 11, wherein the processing circuitry is further configured to:

determine, in response to determining that a capacitive response of the plurality of capacitive responses is an object response, positional information based on the capacitive response; and transmit the positional information to the computing system.

13. An input device, comprising:

an input surface; and a plurality of sensor electrodes coupled to a processing system, the plurality of sensor electrodes configured to generate a capacitive image of a sensing region, wherein the capacitive image describes changes in variable capacitance among the plurality of sensor electrodes, wherein the processing system is configured to identify an object signal value corresponding to an object response within the capacitive image, wherein the object response is produced by an input object that is proximate to the sensing region, wherein the processing system is further configured to:

determine an artifact threshold using the object signal value of the object response, wherein determining the artifact threshold comprises:

determining a maximum signal amplitude of the object response, and designating the artifact threshold as a portion of the maximum signal amplitude, determine a plurality of capacitive responses within the capacitive image, determine, using the artifact threshold, which of the plurality of capacitive responses are artifact responses, and exclude the one or more artifact responses from a report to a computing system.

14. The input device of claim 13, wherein the capacitive image comprises a plurality of sensor values obtained by the plurality of sensor electrodes, wherein the object signal value corresponds to a sensor value with a maximum change in the variable capacitance among the plurality of sensor values, and wherein the artifact threshold is a percentage of the maximum change in capacitance.

15. The input device of claim 13, further comprising:

a plurality of force sensor electrodes configured to detect an input force in response to a deflection of the input surface, wherein the processing system is configured to determine, using the plurality of force sensor electrodes, force information corresponding to the input force, and wherein the force information is determined by the processing system using positional information determined from the object response.

16. The input device of claim 15, wherein the plurality of force sensor electrodes are further configured to identify the object response within the capacitive image.

* * * * *